(159.)

CHARLES S. HALL.

Improvement in Grain Thresher and Separator.

No. 121,939. Patented Dec. 19, 1871.

Witnesses:
D. S. Johnston
A. F. Sargent

Inventor:
Chas. S. Hall
By W. S. Loughborough &c
Attys.

UNITED STATES PATENT OFFICE.

CHARLES S. HALL, OF ROCHESTER, NEW YORK.

IMPROVEMENT IN GRAIN-THRASHERS AND SEPARATORS.

Specification forming part of Letters Patent No. 121,939, dated December 19, 1871.

*To all whom it may concern:*

Be it known that I, CHARLES S. HALL, of Rochester, in the county of Monroe and State of New York, have invented certain Improvements in Thrashers and Separators, of which the following is a specification:

My invention relates to that class of thrashers and separators in which a separating-raddle is used between the cylinder and the grain-belt; and it consists in a peculiar construction of said raddle, whereby the separation of the straw and grain is rendered complete; and it consists also in an adjustable grating at the rear of the cylinder for the purpose of properly guiding the grain and straw in their issue from the latter.

Figure 1:
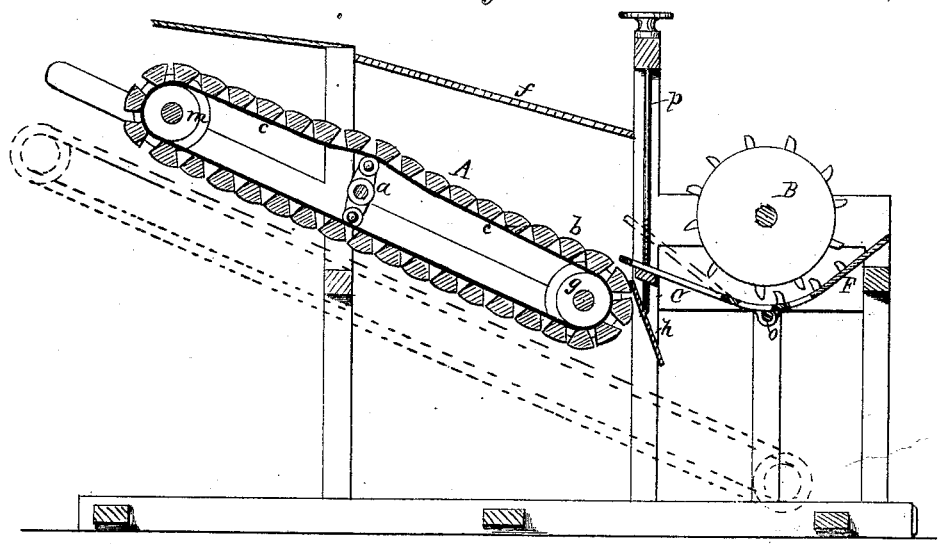
Figure 2:
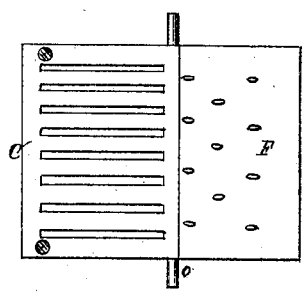
Figure 3:
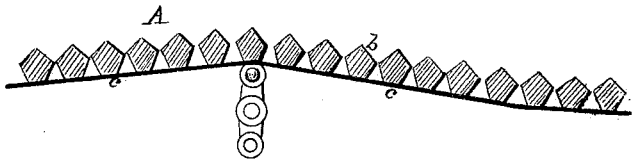

In the drawing, Figure 1 is a vertical longitudinal section of my invention. Figs. 2 and 3 are details.

I have found by experiment that in the use of an open revolving raddle above the grain-belt in separators straw passes through it and becomes entangled therein, hindering the separation and clogging the machine.

To obviate this trouble I construct the raddle A with transverse slats $b$ of the peculiar-shaped section shown in Figs. 1 and 3, such section being that of a pentagon, as in Fig. 3, or of an irregular four-sided figure having one convex face, as in Fig. 1. One of the narrow faces of the slats are fastened to the belts $c$, which are endless and run over suitable pulleys above the grain-belt, shown in dotted lines in Fig. 1. These slats are located on the belts $c$ so that their contiguous edges nearly or quite meet when the belt lies straight, thus preventing the grain or straw from passing through it, while the valleys formed upon the upper surface by the convexity of the slats gather and retain the grain. An agitator, $a$, is placed underneath the upper portion of the belt, which imparts to it a vertical movement; and it will be observed, by reference to Fig. 1, that as the agitator lifts the raddle the adjacent edges of the slats separate sufficiently to allow the grain gathered in the valleys between them to pass readily through it. The grain thus drops upon the lower portion of the raddle and is carried down to its lower end and delivered to the grain-belt through the spaces between the slats, caused by the raddle running over the supporting rollers $g$.

It will be observed that any grain which fails to pass through the raddle near the agitator is delivered to the grain-belt at the upper end in the same manner. The raddle A, therefore, entirely prevents the passage of the straw and chaff; but, by means of its peculiar construction and the operation of the agitator, allows the grain to pass freely through it.

The grating C in the rear of the cylinder has been usually constructed with the bars running parallel with the axis of the cylinder B, and they were thus liable to catch and retain the straw and headings and clog the cylinder. I therefore make the bars of the grating at right angles to said axis or parallel with the line of revolution of the cylinder, whereby the straw passes freely away from the latter, a portion of the grain falling through the grating upon the chute $h$, and from thence to the grain-belt. I also pivot this grating, at the inner edge, upon a rod, $o$, and make the outer end or edge adjustable vertically by means of screws $p$ or other suitable regulating devices. By this means the direction in which the straw leaves the cylinder is governed, it being desirable that short straw should strike the iron lining of the deck $f$ near the cylinder, and, falling from thence upon the raddle A near its lower end, receive a thorough agitation upon the latter, while, on the other hand, long straw may be directed further out upon the raddle, being less difficult to separate.

By this construction and adjustment of the grating C I may dispense with the usual drop-boards, which hang from the deck $f$ to prevent the grain from flying out at the rear of the machine; and, by causing the mixed material from the cylinder to be projected against the deck and fall upon the raddle A, I obtain a more perfect separation than is possible with the old construction. The slats of the raddle are so proportioned that the spaces between them at the base are somewhat larger than at the adjacent edges to allow free egress to the grain, and, in practice, the pentagonal form shown in Fig. 3 will probably be found preferable, since it affords deep valleys for the grain and will transport the straw more readily.

The upper face of the grating C is made smooth and without any transverse ribs, the grain and straw thus passing freely from it without danger of clogging.

What I claim is—

1. The endless raddle A, composed of slats $b$, constructed and arranged substantially as described, in combination with a suitable agitator, $a$, whereby the grain is permitted to pass between the slats above and below said raddle when thrown out of line by the agitator, for the purposes set forth.

2. In combination with the thrashing-cylinder B, the grating C having a smooth upper surface and provided with openings running parallel with the line of rotation of the cylinder, for the purposes set forth.

3. The grating C, constructed substantially as shown and described, and made adjustable vertically by means of regulating-screws $p$ or their equivalents, substantially as and for the purposes set forth.

CHAS. S. HALL.

Witnesses:
F. H. CLEMENTS,
D. L. JOHNSTON.

(159)